Patented June 23, 1931

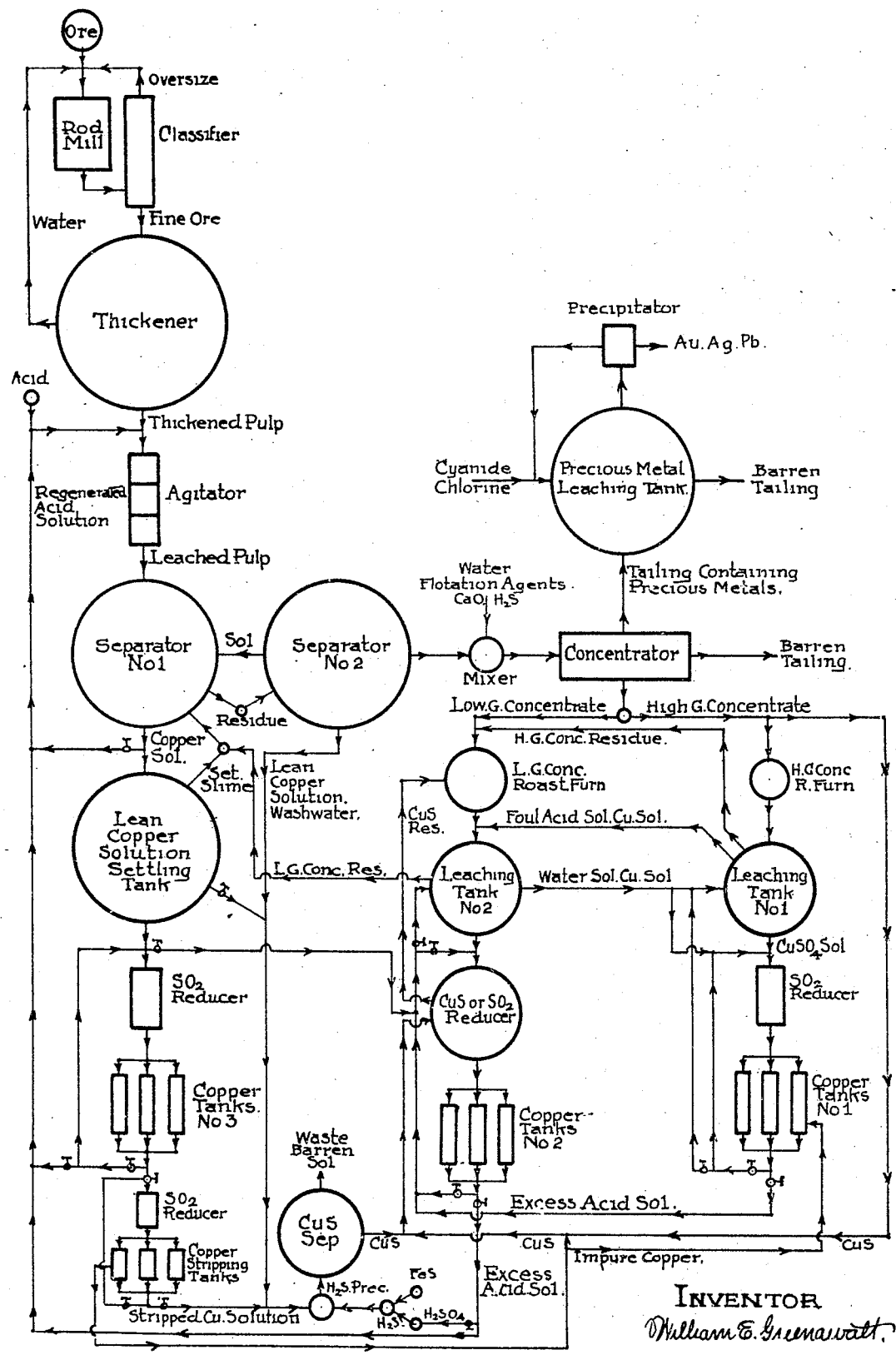

1,810,395

UNITED STATES PATENT OFFICE

WILLIAM E. GREENAWALT, OF DENVER, COLORADO

COPPER EXTRACTION PROCESS

Application filed February 14, 1927. Serial No. 167,999.

The process relates more particularly to the treatment of mixed oxide (including carbonate and silicate) and sulphide copper ores. It has as its object the production of electrolytic copper from such ores without resorting to regular smelting and refining methods, which in most mining districts, are too expensive for general adoption, especially in small or medium sized units.

The economical treatment of mixed oxide and sulphide copper ore presents rather a difficult problem. Methods which are applicable for the extraction of the oxidized copper are not satisfactory for the extraction of the sulphide copper.

The usual methods of treating mixed oxide and sulphide copper ore are; first, by concentrating the ore to separate a sulphide concentrate and an oxidized tailing, smelting the concentrate, and leaching the tailing with dilute sulphuric acid solution and precipitating the copper from the leach solution with metallic iron; second, by leaching the rather coarsely dry crushed ore with dilute sulphuric acid, then regrinding the leached ore and subjecting it to flotation to recover the sulphides; third, by the addition of a sulphidizing agent to the finely ground ore and floating the oxides and the sulphides together, and smelting the concentrate; and fourth, by leaching the rather coarsely crushed ore with an acid ferric salt solution by percolation to extract both the oxidized and the sulphide copper and precipitating the copper from the resulting solution electrolytically with the regeneration of acid and ferric iron.

The first of these methods involves the loss of the acid for leaching and the iron for precipitation, excessive dilution of the solutions, and the separate treatment by smelting of both the sulphide copper and the copper precipitate. In the second method a double treatment is necessary, involving dry grinding for leaching and wet grinding for flotation, and also the separate treatment by smelting of the concentrate and the precipitate. The third method has been tried for many years, but apparently the sulphidizing of the oxidized copper minerals so as to float them with the sulphide minerals, has not met with the encouragement that was at one time hoped for. The fourth method has the advantage that the oxidized and sulphide copper can be extracted with the acid ferric salt solution, but it labors under the disadvantage that the oxidized copper is quickly dissolved while extremely prolonged time is necessary to adequately extract the sulphide copper, and the regeneration of the ferric iron during the electrolytic deposition of the copper, implies a low current efficiency or diaphragm complications, and usually also heating of the solutions. Then, too, the process is practically limited in its application to mixed ore in which the sulphide copper occurs as chalcocite, since the action of ferric iron on chalcopyrite and bornite is too slow to offer promising possibilities.

In the present process some of these difficulties are overcome and others are minimized, so that it is possible and practical to extract the copper in its oxide and sulphide combinations by a continuous process at no extra acid expense, and to obtain all of the copper as the electrolytic metal. This process may be considered as a modification of that described in my Patent No. 1,614,668, and on my pending application, Serial No. 147,824, Nov. 9, 1926.

In describing the process reference may be made to the accompanying drawing, which is a flow sheet of the process in diagrammatic plan.

The ore as it comes from the mine may be crushed dry, as usual, to the desired fineness for the wet fine grinding machine. Wet grinding is preferred to dry grinding. Either a rod mill or a ball mill may be used for the wet fine grinding. A rod mill is preferred.

The dry crushed ore is fed to the rod mill, with about 25% or 30% water to give the pulp the proper consistency for economical fine grinding. The wet finely ground ore flows from the rod mill into the classifier, and enough water is added to give the right pulp consistency for the classification to the fineness desired for flotation, which may be assumed as being about 48 mesh. This will require about 3.5 tons of water per ton of ore ground and classified.

The classified pulp flows into the thickener, where some of the water used in the grinding is removed and may be returned to the rod mill. The thickened pulp may contain from 50% to 100% water. In ordinary thickening practice a pulp ratio of one of water to one of ore can easily be obtained without much care in the operation. To this thickened pulp is then added acid or acid solution so that the ratio of acid solution to ore will be about 4 to 1. This will give a good pulp consistency for effective agitation. The acid pulp is then agitated in the agitator until the oxidized copper is sufficiently extracted. Since it is preferred to initially grind the ore to the desired fineness for flotation, the oxidized copper in this finely ground ore is quickly brought into solution with dilute acid and effective agitation. Agitators for fine ore, like Pachuca tanks, may be used, as in ordinary practice. The agitation of fine ore is much simpler and cheaper than the agitation of coarse ore.

The leached ore flows from the agitator into the separator No. 1, where the copper solution is separated from the insoluble residue or tailing. With care it is practical to dewater down to about 50% of the weight of the ore in ordinary separators used for this purpose. The copper solution from separator No. 1 flows into the lean copper solution tank, which should be sufficiently large to permit the solution to be clarified by allowing the slime to settle to the bottom of the tank. This settled slime is transferred from time to time back to the separator No. 1, to be gotten rid of with the residue.

The unwashed residue flows from separator No. 1 to separator No. 2, where it can be washed to any extent desired. It can be completely washed, if desired, and the copper can be precipitated chemically from the lean washwater, with any convenient precipitant, such as hydrogen sulphide or metallic iron. It is difficult and expensive to completely wash the soluble copper from the acid leached residue, and it would necessitate a fairly large washing and precipitation plant to take care of the large amount of very dilute washwater. It is preferred therefore to avoid or to minimize the washwater difficulty and to precipitate the residual portion of the soluble copper in the leached residue as the sulphide, and then to float the precipitated copper sulphide with the naturally occurring sulphide in the ore. Precipitated copper sulphide is extremely easy to float, and by precipitating the small portion of the soluble copper in the leached residue, washing will be avoided, or minimized, and it will not cost any more and probably less to precipitate the small amount of soluble copper in the residue than to precipitate it from a large amount of washwater, neither will it add any extra expense to the flotation treatment of the residue subsequent to leaching.

The lean copper solution, which for illustration purposes may be assumed as containing about 0.3% copper, flows from the lean copper solution tank into the $SO_2$ reducer, where ferric iron is reduced to the ferrous condition, with the simultaneous regeneration of an equivalent of acid. The solution then passes to the apparatus for the precipitation of the copper. A portion of the electrolyzed solution is returned to the $SO_2$ reducer, to reduce ferric iron formed by the electrolysis to the harmless or beneficial ferrous iron, and the cycle of reduction and electrolysis is repeated until the solution is impoverished down to about 0.1% copper. A portion of this solution is returned to the agitator to pass through another complete cycle of leaching and electrolysis, while another portion—that which is to be wasted—is again reduced with sulphur dioxide and flows into the copper stripping tanks, where the waste solution is stripped of copper electrolytically to the economic limit, which may be assumed to be from 0.05% to 0.025% copper. This is possible with a highly reduced solution, and a low current density which is made possible with a highly reduced solution.

If it is desired to enrich the head solution in copper for electrolysis, a portion of the solution, with some free acid, may be returned from the separator No. 1 to the agitator.

The discarded electrolyzed solution flows from the stripping tanks into the $H_2S$ precipitator, where the residual copper is precipitated, and then into the CuS separator, where the CuS is separated from the barren solution.

It is preferred to precipitate the copper from the lean copper solution obtained from leaching the oxidized copper in the ore, but if the copper solution is too lean for effective electrolysis, all of the copper may be precipitated chemically. If the residue in separator No. 2 is washed, either partly or entirely, the washwater is also precipitated chemically, preferably as the sulphide.

The leached residue in separator No. 2, is diluted with water to give the desired pulp fluidity for effective flotation. A precipitation agent, preferably a sulphide, such as hydrogen sulphide, calcium or sodium sulphide, is applied to the residue to precipitate the copper. If the flotation is done in an alkaline circuit, lime may be added to neutralize the acid. The flotation agents are added to the pulp and the whole is thoroughly mixed in the mixer. If desired, the mixer may be a grinding machine, but it will usually be best to grind to the desired fineness for flotation, in the rod mill, and thus avoid any regrinding complications. The copper leached residue, properly prepared for flotation, is treated in the concentrator to separate the sulphide precipitate and the natural sulphides in the ore by flotation, or by flotation and gravity concentration combined. If the concentrator tailing does not contain recoverable values in the precious metals, the barren tailing is wasted. If it contains precious metals in recoverable amounts, it is transferred to the precious metal leaching tank, where the precious metals can be extracted by any of the well known methods, such as cyanidation or chlorination.

One of the outstanding difficulties in the treatment of copper concentrate by roasting, leaching and electrolysis, is to roast the concentrate so as to get an extraction of the copper by leaching comparable to that obtained by smelting. Ferrites and ferrates are formed in roasting, and when these compounds are formed to a considerable extent, it is difficult, and usually impractical, to get a high extraction of the copper. By special roasting, or extremely careful roasting under ordinary conditions, the ferrite and ferrate trouble can be minimized, but the results are more or less unreliable, and a factor of safety, in any case, should be provided in commercial operations. It is therefore preferred to separate the concentrate so as to obtain a relatively large amount of low grade copper concentrate and a relatively small amount of high grade concentrate. It is immaterial how this separation is made.

If the ratio of concentration of the leached residue is 19 into 1, ninety five per cent, or 95 tons per 100 tons of ore or residue, would be wasted, as usual in ordinary flotation or gravity concentration. The sulphides would be recovered as about five tons of concentrate per 100 tons of ore or leached residue.

The copper leached and flotation tailing residue would contain very little copper and the extraction would ordinarily be almost complete, for the reason that the surface of the sulphides in the copper leached residue would be completely exposed, and the flotation effect would be at its maximum. This is one of the advantages of the present process, as compared with leaching after flotation. In mixed ore a sulphide particle may be, and usually is, enclosed or coated with oxidized copper, such as the oxide, carbonate, or silicate. The sulphide particle, so enclosed or coated, is difficult to float, and the extraction of the sulphide copper will be correspondingly low. The sulphide remaining in the flotation tailing with the oxides, is not recovered by subsequent acid leaching to extract the oxidized copper, but remains undissolved and is lost. It is true that the abrasive effect of grinding has a tendency to remove the oxide coating from the sulphide particles, but this is never as complete as in leaching.

In the concentration treatment of the copper leached residue, either by gravity or flotation, a certain amount of very high grade concentrate may be usually separated from the large amount of ordinary sulphide concentrate, but the relatively small amount of very high grade concentrate will contain a relatively large portion of the total copper. Usually this relatively small amount of high grade concentrate will be in the form of the practically pure minerals, chalcocite, bornite, and chalcopyrite. Pure chalcocite contains 79.8% copper and 20.2% sulphur; pure bornite contains 55.8% copper, 28.6% sulphur, and 16.36% iron; pure chalcopyrite contains 34.6% copper, 24.9% sulphur, and 30.5% iron.

The five tons of concentrate, assuming 0.75% recoverable sulphide copper per ton of original ore, if mixed, would assay about 15% copper and contain 1500 pounds of copper. If the copper concentrate is separated into a high grade and a low grade concentrate, it should be practical, under most conditions, to make a separation so as to get 0.75 ton of high grade concentrate, 50% copper, 750 pounds total; 4.25 tons of low grade concentrate, 8.8% copper, 750 pounds total.

There should not be any difficulty in getting a 50% copper concentrate in the relatively small amounts indicated, if much of the copper in the ore is in the form of chalcocite, and this is frequently the case in what are known as porphyry or disseminated deposits. It will be understood, however, that the process is not particularly limited to the percentage of copper in the high grade concentrate, but that the higher the grade of the high grade concentrate, the better the process can be operated as a whole.

The relatively small amount of high grade concentrate, which according to the specific case assumed for illustration purposes will consist of 0.75 ton of 50% copper concentrate per 100 tons of original ore, is roasted so as to make as much as practical of the copper water soluble and a very high percentage acid soluble. By careful roasting, from 80% to 85% of the copper can be made water soluble and from 90% to 98% can be made acid soluble.

When copper ore or concentrate is roasted so as to make a large portion of the copper water soluble, some iron is also made soluble, but the amount of water soluble iron is small as compared with the acid soluble iron.

The roasted high grade concentrate is transferred to the leaching tank No. 1, where it is leached, preferably first with water or a practically neutral copper solution, and then with dilute acid, altho the acid leach may at times be dispensed with to advantage, especially when the water soluble copper is exceptionally high.

The roasted high grade concentrate is leached with water or with very dilute acid solution, which will extract from 80% to 85% of the copper, most of which is water soluble. The resulting copper solution will be quite pure, altho it will contain small amounts of iron and other impurities, but not in sufficient amounts to seriously affect the subsequent electrodeposition of the copper.

The copper solution flows from the leaching tank No. 1 to the $SO_2$ reducer, and from the reducer to the copper tanks No. 1, where the copper is deposited as electrolytic copper of great purity, with the simultaneous regeneration of acid. The $SO_2$ reducer may not be necessary, but the operation is under better control by its use. Owing to the small amount of injurious impurities in the electrolyte, the solution can be fairly impoverished in copper and regenerated in acid. The impoverished solution, low in copper and relatively high in acid, may then be transferred to the low grade concentrate leaching and electrolytic circuit. A portion of it may be returned to the roasted high grade concentrate leaching tank No. 1 to extract the acid soluble copper. If the solution issues from the leaching tank No. 1, containing, say 8% or 10% copper, and containing only a small amount of iron, it is quite practical to impoverish the solution down to 2% copper, with a very high ampere efficiency.

The relatively large amount of low grade concentrate, which according to the specific case assumed for illustration purposes will consist of 4.25 tons of 8.8% copper concentrate per 100 tons of original ore, is roasted so as to make as much copper water soluble as practical, and a high percentage soluble in dilute acid. From 75% to 85% of the copper can be made water soluble by careful roasting, and from 90% to 97% can be made acid soluble.

The roasted low grade concentrate is, preferably, first leached with water or with a very dilute acid solution, in leaching tank No. 2, to extract the water soluble copper, and the rich water soluble copper solution is flowed into the high grade concentrate leaching and electrolytic circuit, preferably by applying it to the roasted high grade concentrate. The water soluble copper solution will be practically neutral and contain very little iron, as described for the high grade concentrate. If, however, there should be more iron in the water soluble copper solution than desired, the iron will be largely precipitated when the solution is applied to the roasted high grade concentrate. The water soluble copper solution from the low grade concentrate, transferred to the high grade concentrate leaching and electrolytic circuit by using it as the leach solution for the roasted high grade concentrate, will give a very rich and a quite pure neutral or nearly neutral copper sulphate solution, and the amount of water used will be reduced to a minimum. With care in leaching, most of the iron may be precipitated from the water soluble copper solution with the roasted high grade concentrate, and when the roasted high grade concentrate leached residue is reroasted, the precipitated iron will be made insoluble. The water soluble copper solution obtained by first leaching the roasted low grade concentrate and then the roasted high grade concentrate, is then electrolyzed to deposit the copper and regenerate acid, as described for the copper sulphate solution obtained from leaching the high grade concentrate. Copper sulphate is quite soluble in water. At 70 deg. C., which would be a fair temperature of the water in leaching hot roasted concentrate, a water saturated solution of copper sulphate will contain about 12.93% copper and there should be no difficulty in keeping the head solution for copper deposition at from 8% to 10% copper, in leaching the roasted concentrate as described. Such a rich copper solution is not necessary, nor may it be desirable, but it is obtainable if desired. The current efficiency in the deposition of the copper from the copper solution obtained from leaching the roasted concentrate as described should closely approach the theoretical, and it should be quite practical to get about 1.4 pounds of copper per kilowatt-hour, in commercial operations.

The regenerated acid solution, resulting from the deposition of the copper from the relatively pure water soluble copper solution, is quite free from injurious impurities. A portion of this acid solution may be added to the water, for the water soluble copper solution, in amount so that the acid will be quickly neutralized by the copper in the roasted concentrate which is insoluble in water. This acid soluble copper will be mostly in the form of oxide. Iron is not readily soluble in a very weak acid solution, but, at the same time, the copper oxide in the roasted concentrate will be quickly dissolved in a very weak acid solution, without appreciably increasing the iron content of the solution, and, as already indicated, if the iron occurs in the solution in undesirable amounts, it can be precipitated from the neutral solution with an excess of concentrated copper oxide. The precipitated iron in the leached high grade concentrate residue can be made insoluble by roasting the residue with the low grade concentrate. It should be practical, in this way, to extract 80% of the copper from the roasted low grade concentrate and from 90% to 95% of the copper from the roasted high grade concentrate, as water soluble copper, without appreciably fouling the solution.

After the roasted low grade concentrate has been leached with water or very dilute acid to extract the water soluble copper or a portion of the copper oxide without appreciably fouling the solution of the high grade concentrate leaching and electrolytic circuit, it is leached with the regenerated acid solution obtained from depositing the copper from the water soluble copper solution. This dilute, although relatively strong acid copper solution will usually be impure. It will contain the relatively small amount of impurity from the water soluble copper leaching and electrolytic circuit, and the relatively large amount of impurity resulting from leaching the roasted low grade concentrate with an excess of the dilute acid solution to extract the acid soluble copper. The dilute acid solution applied in excess will dissolve the copper in the roasted low grade concentrate which was not soluble in water, or in very dilute acid, and if the total extraction is from 95% to 97%, the leached roasted low grade concentrate residue will contain from 0.25% to 0.45% copper, which would represent a satisfactory extraction. It is preferred to leach the high grade concentrate with acid, after water leaching, and transferring the acid leach copper solution from the high grade concentrate to the low grade concentrate leaching and electrolytic circuit.

The impure solution from acid leaching the low grade concentrate, containing salts of iron and other impurities, flows into the settler or CuS reducer, where it may be clarified and treated with a reducing agent, such as copper sulphide, to reduce ferric iron to ferrous iron. The reduced solution flows into the copper tanks No. 2, where copper is deposited and acid and ferric iron are regenerated. A portion of the solution is returned to the roasted low grade concentrate and the cycle repeated until the copper in the roasted low grade concentrate is sufficiently extracted, as described in my Patent No. 1,483,056, Feb. 5, 1924, and another portion—the excess—is used to leach the copper in oxidized form, such as the oxide, carbonate, or silicate from the original ore.

After leaching the roasted high grade concentrate and the roasted low grade concentrate to extract the water soluble copper and depositing the copper from the relatively pure copper solution as the electrolytic metal of exceptional purity, it is preferred to leach the high grade concentrate with the regenerated acid solution to extract the acid soluble copper. The acid solution will also dissolve much or most of the precipitated or hydrolyzed iron in the concentrate resulting from leaching the water soluble copper, and hence the acid soluble copper solution will contain a considerable amount of iron. The impure acid copper solution from leaching the high grade concentrate is then used to leach the roasted low grade concentrate residue, after leaching the roasted low grade concentrate to extract the water soluble copper.

The impure acid solution will extract the acid soluble copper from the low grade concentrate, as also acid soluble impurities, principally iron. This solution, containing salts of iron, preferably in considerable amounts, is then electrolyzed in the copper tanks No. 2, in the low grade concentrate leaching and electrolytic circuit.

In the deposition of the copper, acid and ferric iron are regenerated. Their relative amounts will depend mostly on the composition of the anode, the amount of ferrous salt in the electrolyte, and the temperature of the electrolyte. Either sulphur dioxide, copper sulphide, or precipitated metallic copper may be used in reducing the ferric iron produced by the deposition of the copper, in copper tanks No. 2, to the ferrous condition. Copper sulphide is preferred. The copper sulphide will usually consist, in part at least, of the precipitate obtained from precipitating the copper from the waste foul solutions and lean washwaters, with hydrogen sulphide or some other sulphide precipitation agent. If the copper in the ore is largely in the form of chalcocite, the chalcocite may also be conveniently used for reduction purposes, the same as precipitated copper sulphide.

Under these conditions, with effective copper sulphide reduction of the ferric iron, a high current efficiency can be obtained in the deposition of the copper, ranging from 1.25 pounds to 1.4 pounds per kilowatt-hour, from the foul copper solution in the low grade concentrate leaching and electrolytic circuit, and the copper will be obtained as the practically pure electrolytic metal. If the solution is kept warm or hot, a very large portion of the copper may be dissolved from the copper sulphide in the CuS reducer, whether the copper sulphide is the chalcocite or the precipitate. If the copper sulphide is the chalcocite concentrate, most of the copper can be extracted from the chalcocite without any preliminary treatment such as roasting or smelting, and the loss of copper will be correspondingly reduced. The iron in the low grade concentrate leaching and electrolytic circuit is not harmful, and, as used in this process, is highly beneficial.

The copper sulphide leached residue is transferred from the reducer, either to the high grade or to the low grade concentrate roasting furnace, and roasted with the concentrate, and leached with it. By such a treatment practically all of the copper of the copper sulphide can be extracted.

It will frequently be desirable to maintain the temperature of the solution in the copper concentrate leaching and electrolytic circuits above that normally due to the temperature of the atmosphere or to chemical reactions of the process. By maintaining the temperature of the solution fairly high the power required for the deposition of the copper will be diminished, and the reduction of the ferric iron will be more rapid and complete, and hence the copper of the copper sulphide in the reducer will go into solution more readily.

The excess foul regenerated acid solution from the low grade concentrate leaching and electrolytic circuit, usually quite strong in acid and low in copper, is used to extract the copper in its oxidized combinations from the ore. By mixing the strong acid solution, obtained from the concentrate by leaching and electrolysis, with the weak acid solution obtained from the original ore by leaching and electrolysis, any usual strength of acid may be obtained to leach the oxidized copper from the ore.

The first portion of the copper solution resulting from leaching the ore, coming from the separator No. 1 may be fairly low in acid and fairly rich in copper. This first copper solution, or a portion of it, may be returned to the low grade concentrate leaching and electrolytic circuit to be used as an acid solution. The advantage of this is that ferric iron is more easily reduced in a neutral or only slightly acid solution than in a highly acid solution, and this may help to control the ferric iron in the low grade concentrate leaching and electrolytic circuit, if desired.

Under the conditions of this process, it should be practical to deposit almost all of the copper by electrolysis. If it is assumed, for example, that 15 pounds of extractable copper occurs in the original ore as oxide (including carbonate and silicate) and 15 pounds as sulphide, 28 pounds of the copper can be deposited electrolytically, and the other two pounds would be precipitated chemically. In the operation of the process, about 2.5 pounds of acid can be regenerated per pound of copper deposited. 70 pounds of acid would therefore be produced in the deposition of the 28 pounds of copper. The 15 pounds of oxidized copper in the ore, and, say, 5 pounds of acid soluble copper in the roasted concentrate, or 20 pounds in all, of the acid soluble copper, per ton of ore, would require about 1.5 pounds of acid, per pound of copper, theoretically, to bring the copper in solution. As the amount of acid regenerated would amount to about 3.5 pounds, per pound of acid soluble copper, and the acid required to bring the acid soluble copper into solution would be about 1.5 pounds, theoretically, per pound of copper, there would be an excess of two pounds of acid, per pound of acid soluble copper. This would largely make up for the acid necessarily wasted and that combined with the impurities in the ore, such as iron, lime, and magnesia. If this excess acid is not sufficient, other acid will have to be added, usually in concentrated form. Ordinarily two pounds of excess acid per pound of copper will be sufficient, or nearly so. If excess acid is not conveniently available, the deficiency may be made up by the application of sulphur dioxide from the roasting furnace to the finely ground ore in the agitator, as set forth in my Patent No. 1,614,669, Jan. 18, 1927. Sulphur dioxide is not very effective in getting close extraction in the treatment of copper ores. It is effective in dissolving a very large portion of the easily soluble copper from its oxidized mineralogical combinations. The sulphur dioxide should be applied to the ore before a strong acid solution is applied. The more difficulty extractable acid soluble copper would be extracted by adding the strong acid solution obtained from treating the concentrate by leaching and electrolysis, to the ore partly treated with the sulphur dioxide.

It is preferred, as previously stated, to leach the water soluble copper leached high grade concentrate residue with regenerated acid solution to extract the acid soluble copper. In treating a high grade concentrate, such as that assumed, say 50% copper, an appreciable amount of copper will usually be left in the residue, even though the extraction is fairly high. Instead of making an extraordinary effort to leach this residue to get a very close extraction, it is preferred to reroast the leached high grade concentrate residue, preferably by mixing it with the low grade concentrate. Washing of the residue will not be necessary, and may not be desirable. If this acid leached residue is reroasted with the low grade concentrate, a very high extraction of the copper can be obtained, as set forth in some detail in my Patent No. 1,468,806, Sept. 25, 1923. If, for example, the extraction of the copper in the high grade concentrate is 95%, with a quick acid leach and without washing, the residue will still contain 6.25% copper, assuming a shrinkage of 60% in the weight of the original high grade concentrate. This residue is added to the low grade concentrate and roasted and leached with it, at very small extra expense.

In the treatment of the low grade concentrate acid leached residue, it is preferred to transfer the residue, either unwashed or but slightly washed, to the finely ground ore, in separator No. 1, where it is washed and treated with the finely ground leached oxidized ore at very small expense. It is treated with the leached ore residue by flotation. In roasted ore there is frequently some undecomposed sulphide; this sulphide would be recovered by the flotation treatment, and would pass through another cycle. Its amount would be small in any case, but the treatment would always act as a factor of safety in making a high recovery of the copper from the concentrate.

It will be observed that by this method of procedure there is no elaborate installation or washing the concentrate residue, and that there is no special precipitation of the copper from the washwaters in the treatment of either the high grade or the low grade concentrate. This is a decided advantage over separate washing of the concentrate residue and the leached finely ground ore.

It is preferred to confine the wasting of electrolyzed solution to the leaching of the oxidized or mixed ore. The excess acid from leaching the high grade concentrate is preferably used in leaching the roasted low grade concentrate, and the excess acid from leaching the low grade concentrate is used to leach the oxidized copper of the ore, and, as the solution becomes foul or accumulates in excess due to wet grinding and to cyclic leaching and electrolysis, it is preferred to withdraw or bleed a certain amount of the solution flowing from the copper tanks No. 3, and subject it to sulphur dioxide reduction, and then strip the solution of copper by electrolysis to the economic limit, which may be as low as 0.05% to 0.025% copper, with a low current density and a highly reduced solution. The copper in this waste solution is then completely precipitated chemically, preferably with hydrogen sulphide. The CuS precipitate may be added to the CuS reducer of the low grade concentrate leaching and electrolytic circuit, to be redissolved and converted into the electrolytic metal.

The impure copper cathodes from the stripping tanks, or from copper tanks No. 3, may be transferred to copper tanks No. 1 of the high grade concentrate leaching and electrolytic circuit, as anodes, and refined in the relatively pure copper sulphate solution resulting from leaching the roasted high grade concentrate. If this is done, part of the solution in copper tanks No. 1 will be deposited with insoluble anodes, such as lead anodes, and part from the soluble impure copper anodes.

By grinding and classifying the ore wet in the usual way to the fineness desired for flotation and then removing part of the water used in grinding and classifying, the acid solution is considerably diluted, so that it will not be as active in extracting the oxidized copper as a stronger acid solution would be, more acid will have to be wasted, and more copper will have to be precipitated chemically. These undesirable conditions are largely compensated for by leaching by agitation the ore finely ground for flotation, which greatly shortens the time of leaching and makes possible a more complete extraction of the copper than would be otherwise obtainable. The loss of acid is largely compensated for by separating the sulphide concentrate from the leached mixed ore, roasting the concentrate to make as much copper sulphate as practical, and then treating the roasted concentrate by leaching and electrolysis to produce a maximum amount of acid. The chemically precipitated copper can be kept low in any case, due to the stripping of the lean and foul solutions under highly reduced conditions, and this chemically precipitated copper is easily converted into the electrolytic metal in the low grade concentrate leaching and electrolytic circuit, in which it is redissolved by the ferric iron, and then deposited electrolytically as the practically pure electrolytic copper.

If it should be desired to chemically precipitate all of the copper from solution obtained from leaching the oxides of the mixed ore, the dilution of the solutions, used either for leaching or washing, would not be a matter of much consequence.

There is an advantage in separately electrolyzing the water soluble copper solution and the acid soluble copper solution. The water soluble copper solution will contain very little iron, and usually a correspondingly low amount of other soluble impurities. The deposition of the copper from such a solution will be correspondingly simple. The acid soluble copper will contain a relatively large amount of iron, and in the deposition of the copper from a solution high in iron, ferric iron is largely regenerated with the acid, and this ferric iron may be used to convert the impure chemically precipitated copper from the lean and foul solutions, into the electrolytic metal, without interfering with the electrolysis of the water soluble copper solution in which the ferric iron may be maintained exceptionally low. The acid soluble copper leaching and electrolytic circuit may in fact be used as a refining circuit for all the impure copper precipitate obtained from leaching the oxidized copper in the ore, or otherwise, and to convert a large portion of the copper of chalcocite or concentrated copper sulphide into the electrolytic metal without roasting. In any case, the precipitate or the concentrated copper sulphide acts as a reducing agent for the ferric iron, and the reduction of the ferric iron is necessary for the effective deposition of the copper.

If the ore contains considerable oxidized copper it will be usually desirable to precipitate the richer portion of the copper solution electrolytically, and washing the leached residue to separate the richer portion of the washwater from the leached residue and chemically precipitating the copper therefrom, and then, in order to avoid excessive washing, precipitating the residual portion of the dissolved copper in the leached residue as the sulphide, and floating the precipitated copper sulphide with the sulphides naturally occurring in the ore.

It will usually be desirable to heat the solution in the low grade leaching and electrolytic circuit to a temperature above that of the atmosphere or that due to chemical reactions of the process. Ferric iron acts more energetically on the copper sulphide in the CuS reducer when the solution is warm or hot.

I claim:

1. A process of treating mixed oxide and sulphide copper ore comprising, leaching the ore with an acid solution to extract the copper in its oxide combinations, chemically precipitating the copper from the resulting solution, subjecting the leached residue to flotation or gravity concentration to separate a sulphide concentrate, roasting the concentrate to make a portion of the copper water soluble and a portion acid soluble, leaching the roasted concentrate to extract the water soluble copper, electrolyzing the resulting copper solution to deposit the copper and regenerate acid, then leaching the concentrate to extract the acid soluble copper, separately electrolyzing the resulting copper solution containing salts of iron to deposit the copper and regenerate acid and ferric iron, reducing the ferric iron formed by the electrolysis to the ferrous condition with the chemically precipitated copper, and again electrolyzing the solution.

2. A process of treating mixed oxide and sulphide copper ore comprising, leaching the ore with an acid solution to extract the copper in its oxide combinations, subjecting the leached residue to flotation or gravity concentration to separate a sulphide concentrate, roasting the concentrate to make a portion of the copper water soluble and a portion acid soluble, leaching the roasted concentrate to extract the water soluble copper, electrolyzing the resulting copper solution to deposit the copper and regenerate acid, then leaching the concentrate to extract the acid soluble copper, separately electrolyzing the resulting copper solution containing salts of iron to deposit the copper and regenerate acid and ferric iron, reducing the ferric iron formed by the electrolysis to the ferrous condition with concentrated copper sulphide, and again electrolyzing the solution.

3. A copper extraction process comprising, treating copper ore by flotation or gravity concentration to separate a sulphide concentrate, roasting the concentrate to make a portion of the copper water soluble and a portion acid soluble, leaching the roasted concentrate to extract the water soluble copper, electrolyzing the resulting copper solution to deposit the copper and regenerate acid, then leaching the roasted concentrate to extract the acid soluble copper, separately electrolyzing the resulting copper solution containing salts of iron to deposit the copper and regenerate acid and ferric iron, chemically precipitating copper from leach copper solutions, applying the chemically precipitated copper to the electrolyzed acid soluble copper solution to reduce the ferric iron formed by the electrolysis to the ferrous condition, and again electrolyzing the solution.

4. A copper extraction process comprising, treating copper ore by flotation or gravity concentration to separate a sulphide concentrate, roasting the concentrate to make a portion of the copper water soluble and a portion acid soluble, leaching the roasted concentrate to extract the water soluble copper, electrolyzing the resulting copper solution to deposit the copper and regenerate acid, then leaching the roasted concentrate to extract the acid soluble copper, separately electrolyzing the resulting copper solution containing salts of iron to deposit the copper and regenerate acid and ferric iron, reducing the ferric iron formed by the electrolysis of the acid soluble copper solution to the ferrous condition with concentrated copper sulphide, and again electrolyzing the solution.

5. A process of treating mixed oxide and sulphide copper ore by leaching and flotation comprising, grinding and classifying the ore wet to the desired fineness, removing a portion of the water used in wet fine grinding and classifying the ore, then adding acid solution to the wet finely ground ore and agitating the ore pulp to extract the copper in its oxidized combinations, subjecting the leached residue to flotation or gravity concentration to separate a sulphide concentrate, roasting the concentrate to make a portion of the copper water soluble and a portion acid soluble, leaching the roasted concentrate to first extract the water soluble copper and then leaching it to extract the remaining acid soluble copper, separately electrolyzing the water soluble and the acid soluble copper solutions to deposit the copper and regenerate acid, and applying the regenerated acid solution to the wet partly dewatered finely ground ore to extract the copper in its oxidized combinations.

6. A copper extraction process comprising, treating copper ore to separate a high grade and a low grade copper concentrate, separately roasting the high grade and the low grade concentrate, leaching the roasted concentrate to extract a portion of the copper as a relatively pure and relatively rich copper solution, then leaching the roasted concentrate to extract the remaining copper as a relatively impure copper solution containing salts of iron, precipitating the copper from the relatively rich and relatively pure copper solution in one electrolytic circuit, precipitating the copper from the relatively impure copper solution containing salts of iron in another electrolytic circuit to deposit the copper and regenerate acid and ferric iron, reducing the ferric iron so formed with concentrated copper sulphide, and again electrolyzing the solution.

7. A copper extraction process comprising, treating copper ore to separate a sulphide copper concentrate, roasting the concentrate to make a portion of the copper water soluble and a portion acid soluble, leaching the roasted concentrate to extract a portion of the copper as a relatively pure and relatively rich copper solution, then leaching the roasted concentrate to extract the remaining copper as a relatively impure copper solution containing salts of iron, precipitating the copper from the relatively pure and relatively rich copper solution in one electrolytic circuit, precipitating the copper from the relatively impure copper solution containing salts of iron in another electrolytic circuit to deposit the copper and regenerate acid and ferric iron, reducing the ferric iron so formed with concentrated copper sulphide, and again electrolyzing the solution.

8. A copper extraction process comprising, treating copper ore to separate a sulphide copper concentrate, roasting the concentrate to make a portion of the copper water soluble and a portion acid soluble, leaching the roasted concentrate to extract a portion of the copper as a relatively pure and relatively rich copper solution, then leaching the roasted concentrate to extract the remaining copper as a relatively impure copper solution containing salts of iron, precipitating the copper from the relatively pure and relatively rich copper solution to deposit the copper in one electrolytic circuit, precipitating the copper from the relatively impure copper solution containing salts of iron in another electrolytic circuit to deposit the copper and regenerate acid and ferric iron, reducing the ferric iron so formed with a copper precipitate obtained from chemically precipitating copper from solutions undesirable for electrolytic precipitation, and again electrolyzing the solution.

WILLIAM E. GREENAWALT.